Patented June 2, 1953 2,640,765

UNITED STATES PATENT OFFICE 2,640,765

ETCHING

John A. Easley and Harry E. Swayze, Midland, Mich., assignors to The Dow Chemical Company, Midland, Mich., a corporation of Delaware No Drawing. Application February 12, 1951, Serial No. 210,616

17 Claims. (Cl. 41—42)

The invention relates to a method of etching metal. It more particularly concerns an improved method of producing a relief in the surface of an object of a metal easily soluble in acid, as in making a printing plate by etching with an acid solution.

In the conventional method of making a metal printing surface, as in making a photoengraving of an acid-soluble metal such as magnesium, zinc, and their alloys, a light sensitive coating or "enamel" is applied to the metal surface which is usually flat or cylindrical. The coated surface is exposed to light through a negative having an image therein so as to produce a corresponding image in the coating. The exposed coated surface is "developed" forming an acid resistant coating in the form of the image produced by the exposure. The acid resistant coating, which is referred to as a resist, is usually further hardened as by a hardening treatment which increases its resistance to the etching acid. The surface of the metal bearing the so-prepared resist is then subjected to etching by an acid.

The etching is usually carried out with nitric acid suitably diluted with water, the acid solution being usually splashed or otherwise impinged against the object. The acid solution attacks the bare portions of the metal, that is, the portions of the object denuded of the light sensitive material in the developing operation. The rest of the metal surface is protected by the resist from direct attack by the acid which does not penetrate the resist. As the etching proceeds, metal from the bare portions of the object dissolves away leaving the image in vertical relief. As soon as a moderate depth of etch is made in this way, attack by the acid in a lateral direction on the metal supporting the acid-resisting image becomes noticeable and the resist may be undercut slightly around its edges. Before a significant amount of the metal forming the relief is dissolved away by the lateral attack, the etching solution is rinsed off, the rinsed object is dried, and the dried object is then treated to protect the metal relief from lateral attack by the acid when the object is subjected to further etching. One method of providing this protection is to powder the object in each of four directions, i. e. N. S. E. and W. with an acid-resisting powdered material called "etching powder" so as to coat with the powder all sides of the portions of the metal in relief. After each powdering, the powder is "burned in," that is, the powdered etched object is heated to fuse and fix the acid-resisting material in place as an acid resistant coating. The object thus protected by powdering or otherwise is then given a second etch. This etch increases the depth of the prior etch without attack on the metal already in relief, the sides of which are protected from the acid.

The second etch, like the first, is stopped before a significant amount of attack is produced on the sides of the relief below the protected portion, and, as before, the etched object is again rinsed, dried, and given a protective treatment as by powdering so as to form an acid-resisting coating on all sides of the newly formed portion of the relief. The object is then ready for a third etch which is carried out in a manner similar to the preceding etches. The object is thus alternately subjected to etching, protecting of the relief, and etching so as to accentuate the relief while restraining attack by the acid on the image-supporting metal in relief, until a sufficient depth of etch is produced in the surface of the object not coated with resist to meet printing requirements. The number of etches made by the acid or "bites," as these etches are called in the trade, is usually three, four or five depending upon the character of the image and the depth of etch required. The foregoing steps are well-known in the art and are practiced in various ways best adapted to the work in hand.

Although the acid etches away the metal rapidly, the time taken for the entire operation of completing the preparation of the relief or printing surface for example, when several bites are to be made, is inordinately large. This is due mainly to the numerous time-consuming steps of rinsing, drying, and protecting the relief which are required between each bite of the etcher to prevent undercutting the image while obtaining a sufficient depth of etch for the purpose in hand and are more time-consuming than the etching operation itself.

It is the principal object of the invention to provide a method of preparation of a metal relief by etching with acid, as in the preparation of a printing surface, which may be carried out with dispatch. Another object of the invention is to reduce or prevent the attack of the acid on the metal in relief under an acid resist and thereby reduce or eliminate the need for interposing one or more protective treatments, e. g. powdering and burning in, to save the relief from lateral attack as it forms during etching. Other objects and advantages will become apparent during the description of the invention.

The invention is predicated upon the discovery that by including in the acid etching bath, and impinging the bath composition against the object to be etched, certain agents which produce a removable acid resistant film that exerts a controlling effect on the dissolving action of the acid, the dissolving action of the acid normal to the surface of the work is not adversely affected while the dissolving action laterally, that is, in a direction which tends to dissolve away metal in relief and undercut the resist, is substantially reduced. As a result, there is obtained a deeper etch without significant loss in area of surface in relief and one or more, if not all, protective treatments, applied after the relief forms to prevent lateral etching of the relief, may be eliminated. The elimination of some, if not all the protective treatments, results in faster production of a finished etched object and substantial savings in both labor and materials.

In connection with evaluating the effects of the agents added to the acid etching bath according to the invention for controlling the etching action of the acid, the term "etch factor" is used. This term is defined as the ratio of the depth of the etch adjacent to a line of resist to one-half the loss in width of metal at the top of the surface of the relief beneath the line of resist. The etch factor affords a measure of the amount of attack by the acid laterally (i. e. parallel to the surface bearing the relief) compared to the amount of attack downwardly (i. e. normal to the surface bearing the relief). The etch factor varies to some extent with the area of the bare metal exposed to the etcher as well as the depth of etch. For purposes of making comparative tests, these variations may be ignored if the bare metal surface adjacent to the resist is at least 0.02 inch wide and the etch is carried to a depth of at least 0.005 inch in each test.

In tests of nitric acid solutions consisting of from 1 to 50 per cent of $HNO_3$ in water by weight, the etch factors observed range from about 1.5 to about 7 using a magnesium-base alloy plate having a nominal composition of 3 per cent aluminum, 1 per cent zinc, 0.2 per cent manganese, the balance being magnesium and impinging the acid solution against the plate, as by means of an air stream or splashing, until etched to a depth of about 0.010 inch.

By the present invention, the etch factor of the nitric acid etching bath is substantially increased, thereby making it possible to reduce, as already mentioned, the overall time required to produce the desired depth of relief in the metal surface.

In carrying out the invention, nitric acid diluted with water to a suitable concentration is used. It is generally not desirable to greatly dilute the acid as this reduces its rate of action on the metal. On the other hand, if insufficient dilution is employed, the action of the acid may be too severe and the resist may be injured, as when the concentration exceeds about 50 per cent of $HNO_3$ by weight. Concentrations in the range of 3 to 20 per cent $HNO_3$ are generally most useful. A preferred range of concentrations is 5 to 10 per cent, while a concentration of 7 per cent of $HNO_3$ by weight is generally satisfactory.

In accordance with the invention, there is added to the suitably diluted (with water) nitric acid solution a wetting agent comprising an ester of sulfosuccinic acid and an aliphatic alcohol having from 4 to 12 carbon atoms. Examples of such esters are: the alkali metal salts such as diisobutyl sodium sulfosuccinate, diamyl sodium sulfosuccinate, dihexyl sodium sulfosuccinate, and dioctyl sodium sulfosuccinate. In addition to the wetting agent, there is added to the bath a water immiscible organic material which is either liquid at ordinary temperatures or liquefies below the temperature at which the etching bath is normally used and is substantially unreactive with the aqueous nitric acid solution. Illustrative of substances suitable for the purpose are the various petroleum fractions boiling in the range of 90° to 390° C., as for example, gasoline, benzine, kerosene, coal oil, and lubricating oils. These liquids are mixtures of various hydrocarbons, mostly saturated, of the paraffin series having from 6 to 18 carbon atoms. Other examples are turpentine, perchloroethylene, and the diethylbenzenes. The amount of wetting agent and water-immiscible liquid to use depends in part upon the concentration of the $HNO_3$ in the nitric acid solution and in part upon the tendency for these additives to reduce the rate of etching of the nitric acid. If these additives are used in too small an amount, the etch factor is not increased. On the other hand, too large an amount of either the wetting agent or the immiscible liquid interferes with the etching action of the acid. The amounts used fall within these extremes and may be ascertained by trial. In general, the wetting agent may be used in an amount ranging from about 0.003 to 0.04 times the weight of the $HNO_3$ in the solution and the water-immiscible liquid may be used in amount ranging from 1 to 14 per cent of the weight of the nitric acid solution.

The following examples are illustrative of the invention:

*Example 1*

A plate formed of a magnesium-base alloy having a nominal composition of 3 per cent of aluminum, 1 per cent of zinc, 0.2 per cent of manganese, the balance being magnesium is coated with a conventional light sensitive enamel and exposed through a photographic negative having an image of a paragraph of printed matter in light face 5-point sans-serif type on a 6-point base. After the exposure, the plate is developed leaving a resist corresponding to the image of the printed matter, the remainder of the plate being bare.

An etching bath is made having the following formulation:

| | Parts by weight |
|---|---|
| Aqueous nitric acid solution containing 7.14% of $HNO_3$ and 0.1% of dioctyl sodium sulfosuccinate | 96 |
| Kerosene | 4 |

The plate is held at 45° to the horizontal with the mid-point 6.5 inches above the etching bath formulated as above and the bath is splashed upwardly against the plate, the resist bearing surface of which faces downwardly. Splashing is continued for 4 minutes at room temperature; then the plate is rinsed and dried. The bare portions are found to be etched to a depth of 0.0115 inch leaving the resist in sharp relief with an etch factor of 29.

The same solution of nitric acid and dioctyl sodium sulfosuccinate but without the kerosene under the same conditions of use etches a similar plate to a depth of 0.0115 inch in 4 minutes with an etch factor of about 2.5.

*Example 2*

A similar magnesium-base alloy plate to that of Example 1 is coated with a light sensitive enamel in the usual way and exposed through a photographic negative having a series of parallel alternating opaque and transparent lines, the widths of the opaque lines being at least 0.12 inch. After exposure, the plate is developed leaving a series of parallel lines of resist corresponding to the transparent lines of the negative with spaces of bare metal at least 0.12 inch wide between each line of resist.

An etching bath is made having the following formulation:

| | Parts by weight |
|---|---|
| Aqueous nitric acid solution containing 6.9% of $HNO_3$ and 0.1% of dioctyl sodium sulfosuccinate | 98.5 |
| Mineral oil | 1.5 |

The plate is held at 45° with its mid-point 10.5 inches over the bath and etched in similar manner to that of Example 1 for 4 minutes at room temperature. The plate is then rinsed and dried. The bare portions are etched to a depth of 0.010 inch with an etch factor of 12.5.

The same solution of nitric acid and dioctyl sodium sulfosuccinate but without the mineral oil under the same conditions of use etches a similar plate to a depth of 0.0105 inch in 4 minutes with an etch factor of about 5.

*Example 3*

A plate of a similar magnesium alloy and resist to that of Example 1 is held over the etching bath and etched in like manner to that of Example 1 for 4 minutes at room temperature with the following etching bath formulation:

| | Parts by weight |
|---|---|
| Aqueous nitric acid solution containing 10% of $HNO_3$ and 0.2% of dioctyl sodium sulfosuccinate | 96.2 |
| Turpentine oil | 3.8 |

After etching, the plate is rinsed and dried. The bare portions are etched to a depth of 0.0175 inch with an etch factor of 25.

A similar resist bearing plate etched for 4 minutes with the same nitric acid solution similarly used etched the base portions to the same depth with an etch factor of about 2.75.

*Example 4*

A plate of a similar magnesium alloy and resist to that of Example 1 is held over the etching bath in like manner to Example 1 for 4 minutes at room temperature with the following etching bath formulation:

| | Parts by weight |
|---|---|
| Aqueous nitric acid solution containing 6.85% $HNO_3$ and 0.1% of dioctyl sodium sulfosuccinate | 98.5 |
| Perchlorethylene | 1.5 |

After etching, the plate is rinsed and dried. The bare portions are etched to a depth of 0.0115 inch with an etch factor of about 29.

*Example 5*

A plate of a magnesium-base alloy having a nominal composition of 1 per cent zinc, 0.3 per cent cerium, the balance being magnesium, is provided with a resist similar to that of Example 1. The plate is held over the etching bath at 45° with the mid-point of the plate 6.5 inches above the bath.

The etching bath has the following formulation:

| | Parts by weight |
|---|---|
| Aqueous nitric acid solution containing 7% $HNO_3$ and 0.1% dioctyl sodium sulfosuccinate | 97.5 |
| A mixture of 50% of ortho-diethyl benzene and 25% of each of meta- and para-diethylbenzene | 2.5 |

The etching formulation is splashed up against the plate for 4 minutes. The plate is then rinsed and dried. The bare portions are etched to a depth of 0.0115 inch with an etch factor of 29.

A similar plate etched in the same manner with the same nitric acid solution containing the dioctyl sulfosuccinate for 4 minutes etches the bare portions to a depth of 0.01 inch with an etch factor of 2.9.

*Example 6*

A plate comprising 99.2 per cent of zinc, the balance being 0.4 per cent of Pb, 0.35 per cent Cd, 0.01 per cent of Fe, and impurities, and bearing a resist similar to that of Example 1 is etched in a similar manner with the following formulation:

| | Parts by weight |
|---|---|
| Aqueous nitric acid solution containing 10.1% of $HNO_3$ and 0.06% of dioctyl sodium sulfosuccinate | 96 |
| Kerosene | 4 |

After 4 minutes of etching, the plate is rinsed and dried. The bare portions are etched to a depth of 0.009 inch with an etch factor of about 10.

A similar plate similarly etched with the same aqueous nitric acid solution containing the dioctyl sulfosuccinate but without the kerosene is etched to a depth of 0.009 in 4 minutes with an etch factor of about 2.

As an additional comparison, it is to be noted that aqueous nitric acid solutions containing the amounts of $HNO_3$ of the foregoing examples but no wetting agent and used either with or without the water-immiscible liquid etch similar plates to about the same depth in the bare portions and yield etch factors which are all smaller than those obtained with the disclosed improved etching baths containing both the wetting agent and water-immiscible liquid.

We claim:

1. An etching bath comprising a mixture of an aqueous solution containing nitric acid, an ester of sulfosuccinic acid and an aliphatic alcohol having from 4 to 12 carbon atoms, and a water-immiscible organic liquid substantially unreactive with the aqueous nitric acid solution.

2. An etching bath comprising a mixture of an aqueous solution containing from 1 to 50 per cent of $HNO_3$, an alkali metal ester of sulfosuccinic acid and an aliphatic alcohol having from 4 to 12 carbon atoms, and a water-immiscible organic liquid selected from the group consisting of the diethyl benzenes, the amount of the ester being from 0.003 to 0.04 times that of the $HNO_3$ in the nitric acid solution and the amount of the water-immiscible organic liquid being from 1 to 14 per cent of the weight of the said aqueous nitric acid solution.

3. An etching bath according to claim 2 in which the ester is dioctyl sodium sulfosuccinate.

4. An etching bath comprising a mixture of an aqueous solution containing from 1 to 50 per cent of $HNO_3$, an ester of sulfosuccinic acid and an aliphatic alcohol having from 4 to 12 carbon atoms, and a water-immiscible organic liquid substantially unreactive with the aqueous nitric acid solution, the amount of the ester being from 0.003 to 0.04 times that of the $HNO_3$ in the nitric acid solution and the amount of the immiscible liquid being from 1 to 14 per cent of the weight of the said aqueous nitric acid solution.

5. An etching bath comprising a mixture of an aqueous solution containing from 3 to 20 per cent of $HNO_3$, an ester of sulfosuccinic acid and an aliphatic alcohol having from 4 to 12 carbon atoms, and a liquid petroleum fraction boiling in the range of 90° to 390° C., the amount of the ester being from 0.003 to 0.04 times and that of $HNO_3$ in the aqueous nitric acid solution and the amount of the petroleum fraction being from 1 to 14 per cent of the weight of the said aqueous nitric acid solution.

6. An etching bath according to claim 4 in which the ester is dioctyl sulfosuccinate.

7. An etching bath according to claim 4 in which the ester is dihexyl sulfosuccinate.

8. An etching bath according to claim 2 in which the ester is dioctyl sodium sulfosuccinate.

9. An etching bath according to claim 2 in which the ester is diamyl sodium sulfosuccinate.

10. An etching bath according to claim 2 in which the ester is dihexyl sodium sulfosuccinate.

11. An etching bath according to claim 4 in which the water-immiscible liquid is a liquid petroleum fraction and the ester is dioctyl sodium sulfosuccinate.

12. An etching bath according to claim 4 in which the water-immiscible liquid is a liquid petroleum fraction and the ester is diamyl sodium sulfosuccinate.

13. An etching bath according to claim 4 in which the water-immiscible liquid is a liquid petroleum fraction and the ester is dihexyl sodium sulfosuccinate.

14. In a method of etching an object of an acid-soluble metal selected from the group consisting of magnesium, the magnesium-base alloys containing over 80 per cent of magnesium, zinc, and the zinc-base alloys containing over 90 per cent of zinc, said object having portions of its surface masked with an acid resistant coating, the step which consists in impinging upon the surface of the object so as to contact both the masked and unmasked portions thereof, an etching composition comprising an aqueous solution which contains 3 to 20 per cent of $HNO_3$, said solution having in admixture therewith an ester of sulfosuccinic acid and an aliphatic alcohol having from 4 to 12 carbon atoms, and a water-immiscible organic liquid which is substantially unreactive with the aqueous nitric acid solution, said ester comprising from 0.003 to 0.04 of the weight of the $HNO_3$ in the nitric acid solution and the water-immiscible organic liquid comprising from 1 to 14 per cent of the weight of the aqueous nitric acid solution.

15. The method according to claim 14 in which the etching composition comprises an aqueous nitric acid solution containing from 3 to 20 per cent of $HNO_3$, said solution having in admixture therewith an ester of sulfosuccinic acid and an aliphatic acid having from 4 to 12 carbon atoms, and a liquid petroleum fraction having a boiling range in the temperature range of 90° to 390° C., the amount of said ester being from 0.003 to 0.04 times the weight of the $HNO_3$ in the aqueous nitric acid solution and the petroleum fraction being from 1 to 14 per cent of the weight of the aqueous nitric acid solution.

16. The method according to claim 14 in which the etching composition is agitated as well as impinged upon the object to be etched.

17. The method according to claim 14 in which the ester of sulfosuccinic acid is dioctyl sodium sulfosuccinate.

JOHN A. EASLEY.
HARRY E. SWAYZE.

References Cited in the file of this patent

UNITED STATES PATENTS

| Number | Name | Date |
|---|---|---|
| 1,994,500 | Boller | Mar. 19, 1935 |
| 2,062,028 | Howey | Nov. 24, 1936 |
| 2,176,423 | Jaeger | Oct. 17, 1939 |
| 2,472,304 | Mason | June 7, 1949 |